US010880398B2

(12) United States Patent
Li

(10) Patent No.: US 10,880,398 B2
(45) Date of Patent: Dec. 29, 2020

(54) INFORMATION UPDATING/EXCHANGE METHOD, APPARATUS, AND SERVER

(71) Applicant: Tencent Technology (Shenzhen) Company Limited, Shenzhen (CN)

(72) Inventor: Cuixia Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 164 days.

(21) Appl. No.: 16/005,296

(22) Filed: Jun. 11, 2018

(65) Prior Publication Data

US 2018/0295208 A1 Oct. 11, 2018

Related U.S. Application Data

(63) Continuation of application No. PCT/CN2017/086278, filed on May 27, 2017.

(30) Foreign Application Priority Data

May 27, 2016 (CN) .......................... 2016 1 0363929

(51) Int. Cl.
*H04L 29/08* (2006.01)
*G06Q 10/10* (2012.01)
(Continued)

(52) U.S. Cl.
CPC .......... *H04L 67/306* (2013.01); *G06Q 10/10* (2013.01); *G06Q 20/223* (2013.01);
(Continued)

(58) Field of Classification Search
None
See application file for complete search history.

(56) References Cited

U.S. PATENT DOCUMENTS 10,192,274 B2\* 1/2019 Wu ..................... G06Q 30/0621
2008/0288277 A1\* 11/2008 Fasciano ................ G06Q 50/01
705/319
(Continued)

FOREIGN PATENT DOCUMENTS

CN 102752313 A 10/2012
CN 104392535 A 3/2015
(Continued)

OTHER PUBLICATIONS

Office Action dated May 5, 2019 for Chinese Application No. 201610363929.X with concise English Translation, 11 pages.
(Continued)

*Primary Examiner* — Dhairya A Patel
(74) *Attorney, Agent, or Firm* — Brinks Gilson & Lione

(57) ABSTRACT

This disclosure relates to an information updating and exchange method, an apparatus and a server. In one implementation, an information updating and exchange method is disclosed. The method include accessing, from an application running on a terminal device having a processor, a remote information exchange platform via a first user account; receiving, by the terminal device, a first information posted from a second user account of the remote information exchange platform; displaying the first information on a first user interface of the application on the terminal device; receiving, via the first user interface, a first user instruction associated with the first information for initiating a preset exchange event associated with the first information; generating, by the terminal device in response to the first user instruction, a second user interface for displaying an identity information of the first user account in an editable mode; receiving, via the second user interface, a second user instruction for replacing the identity information of the first user account with a target identity information; and updating, by the terminal device, the identity informa-
(Continued)

tion of the first user account displayed on the second user interface to the target identity information according to the second user instruction.

12 Claims, 13 Drawing Sheets

(51) Int. Cl.
| | | |
|---|---|---|
| *G06Q 30/06* | (2012.01) | |
| *H04L 12/58* | (2006.01) | |
| *G06Q 20/32* | (2012.01) | |
| *G06Q 20/38* | (2012.01) | |
| *G06Q 20/22* | (2012.01) | |
| *G06Q 50/00* | (2012.01) | |
| *H04L 29/06* | (2006.01) | |

(52) U.S. Cl.
CPC ....... *G06Q 20/3223* (2013.01); *G06Q 20/383* (2013.01); *G06Q 30/06* (2013.01); *G06Q 50/01* (2013.01); *H04L 51/18* (2013.01); *H04L 51/32* (2013.01); *H04L 63/0407* (2013.01)

(56) References Cited

U.S. PATENT DOCUMENTS

| | | | | |
|---|---|---|---|---|
| 2009/0055292 | A1* | 2/2009 | Chong | G06Q 50/01 705/26.3 |
| 2011/0078270 | A1* | 3/2011 | Galli | G06Q 10/107 709/206 |
| 2013/0144951 | A1* | 6/2013 | Viswanath | H04L 67/2823 709/204 |
| 2014/0229552 | A1* | 8/2014 | Ranganath | G06Q 50/01 709/206 |
| 2014/0250001 | A1* | 9/2014 | Isaacson | G06Q 30/0235 705/39 |
| 2016/0291822 | A1* | 10/2016 | Ahuja | H04L 51/10 |
| 2018/0205720 | A1* | 7/2018 | Westerlund | H04L 67/104 |

FOREIGN PATENT DOCUMENTS

| | | |
|---|---|---|
| CN | 104615747 A | 5/2015 |
| CN | 105227568 A | 1/2016 |
| CN | 105306339 A | 2/2016 |
| CN | 105515948 A | 4/2016 |
| CN | 106096927 A | 11/2016 |
| CN | 105227568 B | 7/2018 |
| JP | 2003-263387 A | 9/2003 |
| JP | 2008-129860 A | 6/2008 |
| JP | 2011-002951 A | 1/2011 |
| KR | 10-2015-0018698 | 2/2015 |

OTHER PUBLICATIONS

Office Action dated Feb. 2, 2019 for Chinese Application No. 201610363929.X, 7 pages.

Office Action dated Mar. 11, 2019 for Japanese Application No. 2018-526694, 6 pages.

International Search Report and Written Opinion dated Aug. 31, 2017 for PCT/CN2017/086278 (10 pp.).

Tistory, "Changing Nickname on Group Chat Room of KakaoTalk", Published on Oct. 29, 2015, 12 pages, Retrieved at <https://gaprime.tistory.com/433>.

Naver Blog, "A method for using KakaoTalk Open Chatting and changing Profile, Open KakaoTalk is easy to use once you get to know", Published on Feb. 17, 2016, 17 pages, Retrieved at <http://blog.naver.com/sweettree7/220626649674>.

Busan Newspaper, "Launching 'Kakao Pay Remittance Service', Now send money via KakaoTalk", Published on Apr. 28, 2016, 4 pages, Retrieved at <http://www.busan.com/view/busan/view.php?code=20160428000179>.

Office Action dated Sep. 27, 2019 for Korean Application No. 10-2018-7013321, 12 pages.

* cited by examiner

INFORMATION UPDATING/EXCHANGE METHOD, APPARATUS, AND SERVER

RELATED APPLICATION

This application claims priority to International Patent Disclosure No. PCT/CN2017/086278, filed with the Chinese Patent Office on May 27, 2017, which claims priority to Chinese Patent Application No. 201610363929. X, filed with the Chinese Patent Office on May 27, 2016, both entitled "INFORMATION UPDATING/EXCHANGE METHOD, APPARATUS AND SERVER", which are incorporated by reference in their entireties.

FIELD OF THE TECHNOLOGY

This disclosure relates to an Internet technology, and specifically relates to an information updating/exchange method, an apparatus and a server.

BACKGROUND OF THE DISCLOSURE

In an existing application client, inter-user text or multimedia messaging may be supported. Further, a resource or the like may be transferred from one user to another user using event messages. For example, in an instant messaging client, the user may chat with a friend, and may further send event messages (for example, send a red envelope representing a monetary value) on a single chat interface. Alternatively, the user may create a chat group with multiple friends, and the user may send some event messages in the chat group (for example, posting a comment or giving a "like" for a statement of a friend in the chat group). On the chat interface, identity of a user posting such event messages may not be hidden from other users in the chat group.

However, in some cases, the user who sends an event may not want to disclose his identity to the chat group. For example, a user may not want to leave his name when performing a public welfare donation in the chat group. However, the existing technology does not support anonymous posting of event messages.

For the foregoing problem, at present, no effective solution has been proposed yet.

SUMMARY

This disclosure provides an information updating/exchange method, an apparatus and a server for initiating anonymous exchange event.

In one implementation, an information updating and exchange method is disclosed. The method includes accessing, from an application running on a terminal device having a processor, a remote information exchange platform via a first user account; receiving, by the terminal device, a first information posted from a second user account of the remote information exchange platform; displaying the first information on a first user interface of the application on the terminal device; receiving, via the first user interface, a first user instruction associated with the first information for initiating a preset exchange event associated with the first information; generating, by the terminal device in response to the first user instruction, a second user interface for displaying an identity information of the first user account in an editable mode; receiving, via the second user interface, a second user instruction for replacing the identity information of the first user account with a target identity information; and updating, by the terminal device, the identity information of the first user account displayed on the second user interface to the target identity information according to the second user instruction.

In another implementation, an information updating and exchange method is further disclosed. The method includes providing, by a server of an information exchange platform, a first user account and a second user account for accessing the information exchange platform receiving a first message by the server from a second terminal device in communication with the information exchange platform via the second user account; sending, by the server, the first message to a first terminal device in communication with the information exchange platform via the first user account; receiving, by the server from the first terminal device via the first user account, a request for replacing an identity information of the first user account with a target identity information, wherein the request is sent from the first terminal device via the first user account upon displaying a second user interface on the first terminal device in response to receiving a first user instruction for initiating a preset exchange event associated with the first message on a first user interface on the first terminal device associated with the information exchange platform, and wherein the second user interface of the first terminal device displays the identity information of the first user account in an editable mode; generating, by the server, the target identity information in response to the request; and sending, by the server, the target identity information to the first terminal device via the first user account.

In another implementation, an information updating and exchange system is disclosed. The system include a terminal device. The terminal device includes a memory for storing instructions and at least one processor in communication with the memory. The processor, when executing the instructions, is configured to cause terminal device to access, from an application running on the terminal device, a remote information exchange platform via a first user account; receive a first information posted from a second user account of the remote information exchange platform; display the first information on a first user interface of the application on the terminal device; receive, via the first user interface, a first user instruction associated with the first information for initiating a preset exchange event associated with the first information; generate, in response to the first user instruction, a second user interface for displaying an identity information of the first user account in an editable mode; receive, via the second user interface, a second user instruction for replacing the identity information of the first user account with a target identity information; and updating the identity information of the first user account displayed on the second user interface to the target identity information according to the second user instruction.

In another implementation, a server for an information exchange platform is disclosed. The server include a memory storing instructions and at least one processor in communication with the memory. The at least one processor, when executing the instructions, is configured to provide a first user account and a second user account for accessing the information exchange platform receiving a first message by the server from a second terminal device in communication with the information exchange platform via the second user account; send the first message to a first terminal device in communication with the information exchange platform via the first user account; receive, from the first terminal device via the first user account, a request for replacing an identity information of the first user account with a target identity information, wherein the request is sent from the first terminal device via the first user account upon displaying a second user interface on the first terminal device in response to receiving a first user instruction for initiating a preset exchange event associated with the first message on a first user interface on the first terminal device associated with the information exchange platform, and wherein the second user interface of the first terminal device displays the identity information of the first user account in an editable mode; generate the target identity information in response to the request; and send by the target identity information to the first terminal device via the first user account.

In the embodiments of this disclosure, because the identity information displaying on the second interface is editable, that is, the identity information of the first account may be changed to other identity information, an objective of hiding real identity information of the first account is achieved, providing anonymous identity when initializing an exchange event.

BRIEF DESCRIPTION OF THE DRAWINGS

The accompanying drawings described herein are used to provide a further understanding of this disclosure, and form part of this disclosure. Exemplary embodiments of this disclosure and descriptions thereof are used to explain this disclosure, and do not constitute any inappropriate limitation to this disclosure.

DESCRIPTION OF EMBODIMENTS

To provide a person of ordinary skill in the art a better understanding of the solutions in this disclosure, the following describes the technical solutions and implementations of this disclosure with reference to the accompanying drawings. The described embodiments and implementations are merely examples. Other embodiments and implementations that may be derived by a person of ordinary skill in the art based on this disclosure without creative efforts shall fall within the protection scope of this disclosure.

It should be noted that, in the specification, claims, and accompanying drawings of this disclosure, the terms "first", "second", and so on are intended to distinguish between similar objects but do not necessarily indicate a specific order or sequence. It should be understood that, data may be interchanged in suitable situations, so that the described embodiments of this disclosure can be implemented in a sequence other than the sequence described herein or shown in the figures. Moreover, the terms "include", "contain" and any other variants are used to cover non-exclusive inclusion. For example, a process, method, system, product, or device that includes a list of steps or units is not necessarily limited to those units, but may include other units not expressly listed or inherent to such a process, method, system, product, or device.

In this disclosure, a method and an apparatus for implementing the method are is provided. It should be noted that, a step shown in a flowchart of the accompanying drawing may be performed in a computer system having a single or a group of computers executing computer instructions. Although a particular logical sequence is shown in a flowchart, in some cases, the step shown or described may be performed by using a variation of the particular sequence.

According to an embodiment of this disclosure, an information updating/exchange method is provided.

Figure 1:
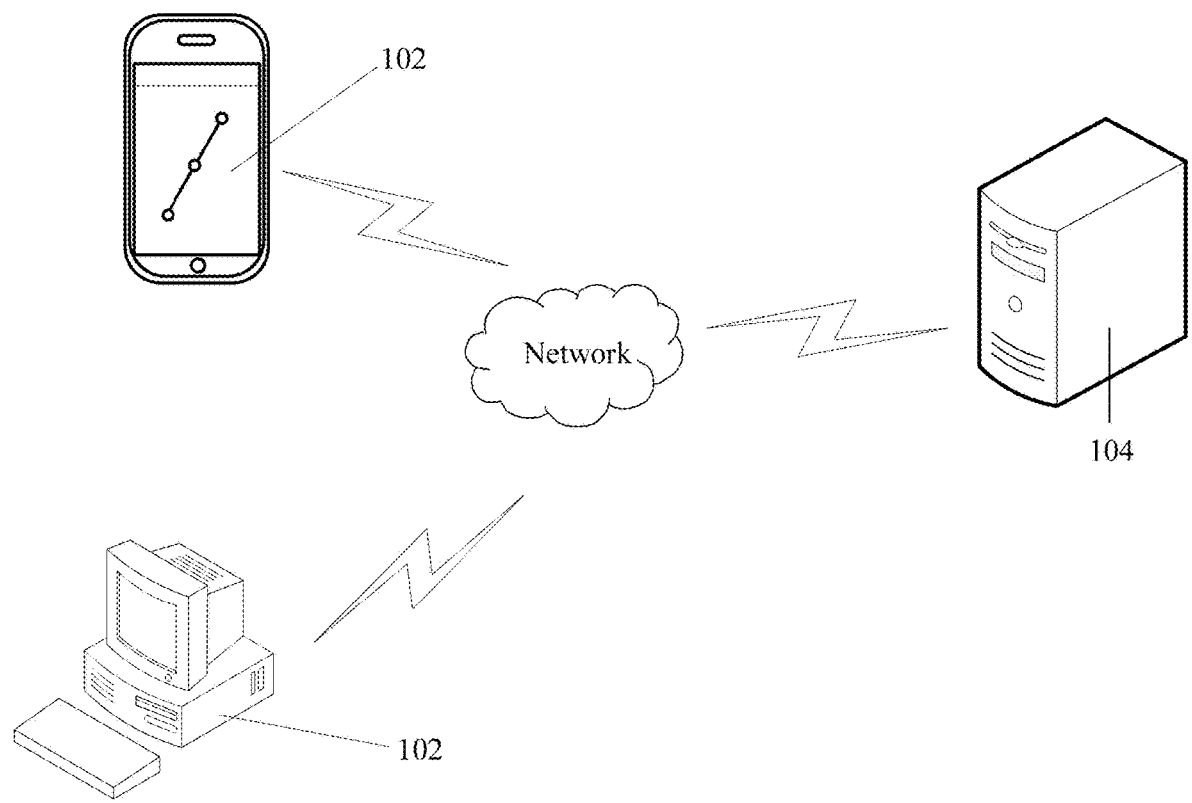
FIG. 1 shows a system architecture diagram for implementing a method for information updating/exchange according to an embodiment of this disclosure.

In some implementations, the information updating/exchange method may be applied to a system environment constituted by a terminal device 102 (alternatively referred to as a "terminal") and a server 104 as shown in FIG. 1. As shown in FIG. 1, the terminal 102 connects to the server 104 by using a network, and the network includes but is not limited to: a mobile communications network, a wide area network, a metropolitan area network or a local area network, a long-haul optical network, and any combination thereof. The terminal 102 may be a mobile phone terminal, or may be a PC terminal, a notebook computer terminal or a tablet computer terminal.

A work principal of a system environment system shown in FIG. 1 is as follows:

The terminal 102 displays a first interface of an application, and a first instruction from, e.g., a user of the terminal 102 associated with a first user account (alternatively referred to as "first account") of the application, is received on the first interface of the terminal, the first instruction being used for instructing execution of a preset event/action on first information. The first information may be published by a second user account (alternatively referred to as "second account") being displayed on the first interface. The terminal 102 sends the first instruction to the server 104.

The server 104 generates a second interface according to the first instruction, and sends information of the second interface to the terminal 102. The terminal 102 receives the second interface sent by the server 104, and displays the second interface received. Identity information of the first account is displayed on the second interface, and the identity information of the first account is in an editable state.

The second interface displaying on the terminal 102 receives a second instruction, from, e.g., the user, and the second instruction is used for instructing to replace the identity information of the first account with target identity information (alternatively referred to as "target information"). The target information may be entered by the user on the second interface, or may alternatively be generated by the server 104 automatically. In a case in which the target information is generated by the server 104, the server 104 sends the target information to the terminal 102, such that the target information is displayed on the second interface of the terminal 102 as an update to the identity information.

In this embodiment of this disclosure, because the identity information displayed on the second interface is editable, that is, the identity information of the first account may be changed to other identity information, an objective of hiding real identity information of the first account is implemented, to resolve a technology problem that an anonymous identity cannot be used for initializing an event in the existing technology, thereby achieving a technology effect by using an anonymous identity when initiating and sending an event/action.

Further, after the identity information is changed, the second interface may then execute the preset event/action, and the updated target information may be displayed on the first interface after the preset event/action is executed. Therefore, other accounts (including a second account) other than the first account cannot learn real identity information of the first account when viewing the messages associated with the preset event/action initiated from the first account of the application.

In some implementations, the terminal used for logging into the first account and a terminal used for logging into the second account may be a same terminal, or may be different terminals.

When the first account and the second account are used for login by a same terminal, and the first account initiates an anonymous event to the second account, a first interface corresponding to the first account on the terminal may be configured such that the identity information of the first account cannot be viewed by clicking the target information in the first interface, and a second interface corresponding to the second account on the terminal may be configured such that the identity information of the first account cannot be viewed by clicking the target information in the second interface.

In some implementations, a terminal used for logging into the first account and a terminal used for logging into the second account may be different. It is assumed that the terminal using the first account for login is terminal A, and the terminal using the second account for login is terminal B. In this case, terminal A and terminal B both operate/run the application for implementing the information updating/exchange method provided in an embodiment of this disclosure. The first account and the second account are both accounts of this application. When the first account initiates an event to the second account anonymously, the identity information of the first account cannot be viewed by clicking the target information on the interface for the application on terminal A, and the identity information of the first account cannot be viewed by clicking the target information on the interface of the application on terminal B.

In some implementations, after the identity information of the first account displayed on the second interface is updated to the target information, the target information may further be reverted to the identity information of the first account. For example, a third instruction may be received from the user on the second interface, the third instruction being used for replacing the target information with the identity information of the first account; and the target information displayed on the second interface is updated and reverted to the identity information of the first account according to the third instruction.

In some implementations, prompt information may be displayed on the second interface, to prompt the user whether the identity information of the first account is in a hidden state. When the identity information of the first account displayed on the second interface is updated to the target information according to the second instruction, a first prompt information may be displayed on the second interface, the first prompt information being used for indicating that the identity information of the first account is in a hidden state. When the target information displayed on the second interface is updated to the identity information of the first account according to the third instruction, a second prompt information may be displayed on the second interface, the second prompt information being used for indicating that the identity information of the first account is in a viewable state.

In some implementations, whether the second instruction carries the target information is detected, after the second instruction is received on the second interface, and the identity information of the first account displaying on the second interface is updated to the target information according to the second instruction, if it is detected that second instruction carries the target information. When it is detected that the second instruction does not carry the target information, then the second instruction may be sent to the server, and the target information generated by the server in response to the second instruction may be received by the terminal. The server, for example, may randomly extract a first group from preset identity information groups and randomly extracting a piece of identity information from the first group as the target information, to be updated as the identity information of the first account displaying on the second interface. That is, the target information may be entered by a user, or may be generated by the server automatically. User-defined personalized custom target information may be implemented by entering the personalized custom target information by a user. Alternatively, multiple pieces of optional target information may be provided by the server to the user, so that the user may select desired custom target information according to user preference, thereby increasing flexibility of the application.

In some implementations, a preset event may be an event of transferring a resource. The present event may be associated with a first information or message being posted or exchanged in the application (a chat message, for example). When the first account transfers the resource to the second account, a value of a to-be-transferred resource sent by the server may be used, or the value of the to-be-transferred resource may be edited by a user of the first account. After a first instruction is received on the first interface of the terminal, the first instruction is sent to the server, the first instruction being used for instructing to execute the preset event associated with the first information. The value of the to-be-transferred resource sent by the server in response to the first instruction is then received by the terminal; and the value of the to-be-transferred resource may be displayed on the second interface, the value of the to-be-transferred resource being in an editable state.

In some implementations, the preset event may be an event of transferring a resource, and the value of the to-be-transferred resource may be generated according to interactive behavior information between the first account and the second account. After the server receives the first instruction, the server may detect the interactive behavior information of the first account and the second account in a preset time period; and the server generates the value of the to-be-transferred resource according to the interactive behavior information and sends the value of the to-be-transferred resource to the second interface of the terminal. If the interactive behavior information satisfies a preset condition, the generated value of the to-be-transferred resource may be set to greater than or equal to a first reference value (alternatively referred to as "first value"), and if the interactive behavior information does not satisfy the preset condition, the generated value of the to-be-transferred resource may be set to less than the first value.

In some implementations, the first account may transfer a resource and leave message information (e.g., comments to a posted message) to the second account at the same time. After the second interface is displayed in response to the first instruction, the message information may be received on the second interface. After the resource is transferred and message is sent from the first account to the second account, the message information and the target information are displayed on the first interface, and the identity information of the first account may be in a non-viewable state.

The first account and the second account may be accounts of social media platforms, such as an instant messaging and microblog platforms. A preset event may be an operation performed on an account or information published by the account. For example, a preset event may include but is not limited to sending a red envelope, making a comment, giving a "like", or donating money. The first information may be information published by the second account, including but not limited to: a text, an image, a voice and a video or the like. The first information may be displayed on an interface of a terminal using the first account for login. The target information may be in a form of an image, a name of certain celebrity, an image or a name of certain landscape, or an image or a name of certain animal, or any combination of the items above. The target information may not include real identity information of the first account, and the real identity information may be registration information corresponding to the account, such as a registered account name, or a registered account profile picture. The to-be-transferred resource may be a red envelope, and the value of the to-be-transferred resource may be a monetary amount of the red envelope to be sent. The to-be-transferred resource may also be certain virtual currency, and the value of the to-be-transferred resource may be a virtual currency quantity to be transferred.

When the target information is displayed on the second interface, a first prompt information may be displayed on the second interface, for prompting the user that identity information of the user is in a hidden state. Persons other than the user cannot view the identity information of the first account. Therefore, another person cannot learn the identity information of the first account.

When the identity information of the first account is displayed on the second interface, a second prompt information may be displayed on the second interface, for prompting the user that the identity information of the user is in a viewable state, and other persons can view identity information of the user when clicking the displayed target information, such as a profile picture of the user.

For example, after the identity information on the second interface of the terminal is changed from a user profile picture to a celebrity image, a background color of the second interface may turn from red to green, and a prompt that "You are in an anonymous state, and other persons cannot view your identity information" is displayed on the second interface; after the identity information on the second interface of the terminal is changed from the celebrity image to the user profile, the background color of the second interface turns from green to red, a prompt that "You are in a non-anonymous state, other persons can view your identity information" is displayed on the second interface.

The server may store multiple groups of identity information (where the multiple groups of identity information are the preset identity information groups), each group of identity information including multiple pieces of identity information. After receiving an identity information replacing request sent by the terminal using the first account for login, the server randomly extracts one group (that is, the first group) from the multiple groups of identity information, and randomly extracts a piece of identity information from the one group as target information.

If the user does not like the target information displaying on the second interface of the terminal, the user may send a third instruction to revert the target information back to the identity information of the first account. After the target information is reverted back to the identity information of the first account, and if the user continues to click the identity information of the first account, the server may send target information different from the previously provided target information as new identity information to the terminal of the user for displaying.

The server may store preset identity information groups, for example, the server stores 100 popular celebrities, the 100 celebrities including 50 male celebrities and 50 female celebrities. The 100 celebrities are divided to five groups (a group A, a group B, a group C, a group D, and a group E), and each group includes 10 male celebrities and 10 female celebrities. If it is detected that the second instruction does not carry the target information, the second instruction is sent to the server. After receiving the second instruction, the server randomly extracts a group from five groups: the group A, the group B, the group C, the group D, and the group E. For example, the group B may be randomly extracted. A piece of identity information may then be randomly extracted from the group B. For example, information of a celebrity B5 is randomly extracted by the server and the information of the celebrity B5 is used as the target information. The server sends the information of the celebrity B5 to the application running on the terminal, so that the user can see a profile picture and a name of the celebrity B5 on the second interface of the terminal. If the user is not satisfied with the target information, a piece of identity information is randomly extracted by the server from remaining 9 celebrities of the group B as target information, and if the user is still not satisfied with the target information, a piece of identity information is randomly extracted by the server from remaining 8 celebrities of the group B as target information. If the user is not satisfied with all the 10 celebrities of the group B, a group is further randomly extracted from four groups: the group A, the group C, the group D, and the group E. For example, group E may be extracted next, and a piece of identity information may then be randomly extracted as the target information from the group E, and so on. If identity information of all the 100 celebrities has been extracted, a piece of identity information is randomly extracted starting from the group B as the target information and the foregoing process is repeated until the user selects a piece of target information to his satisfaction.

In some implementations, if the user does not like the target information displayed on the second interface of the terminal, the target information may need not be reverted back to the identity information of the first account, and when the user continues to click the identity information of the first account, the server sends target information different from the prior selected target information to the terminal of user As new identity information for displaying.

In some implementations, multiple profile pictures of different colors may be set as the target information, or backgrounds of the profile pictures may be set with different colors, and a color is randomly selected by the sever.

The implementation of multiple groups of identity information may facilitate user selection of favorable target information, thereby extending a selection range of the user, and increasing variety and selectivity of content displayed as target information.

The user may transfer from the first account a resource to another account anonymously, and a description in an example in which the first account transfers a resource to the second account anonymously is as follows.

The terminal using the first account for login displays the first interface, the terminal sends the first instruction to the server, and the first instruction may include information of transferring a resource to the second account. After receiving the first instruction, the server sends the value of the to-be-transferred resource to the terminal, the terminal may display the second interface, the second interface may then display the value of the to-be-transferred resource, and the value may be in an editable state. The user may directly use the value of the to-be-transferred resource on the second interface of the terminal as generated by the server, or may click the value for editing.

The server may determine the value of the to-be-transferred resource in various exemplary manners. For example, the value of the to-be-transferred resource may be determined randomly in a specified value range; the value of the to-be-transferred resource may be alternatively determined according to intimacy degree among accounts. In some implementations, the value of the to-be-transferred resource may be determined according to intimacy degree between the first account and the second account. The server detects interactive behavior information between the first account and the second account in a preset time period, and determines whether a relationship between an owner of the first account and an owner of the second account is intimate. The interactive behavior includes chatting (e.g., frequency, duration, and/or contents), amount of comment, amount of "likes", red envelope interactions (e.g., amount, and/or frequency) or the like.

In the preset time segment, if the interactive behavior between the first account and the second account is significant, it indicates that the relationship between an owner of the first account and an owner of the second account is relatively intimate. In this case, in the process of transferring a resource from the first account to the second account, the generated value of the to-be-transferred resource by the server may be relatively great; if the interactive behavior between the first account and the second account is relatively less intimate, it indicates that the relationship between the owner of the first account and the owner of the second account is relatively less close. In this case, in the process of transferring a resource from the first account to the second account, the generated value of the to-be-transferred resource by the server may be relatively small.

For example, it is assumed that Xiao Ming is the owner of the first account, and Xiao Hong is the owner of the second account. If Xiao Ming has contacted with Xiao Hong on QQ (including chatting, giving a like from one to the other or making a comment from one to another) in the last two weeks, a red envelope amount X generated randomly by the server satisfies: 1 yuan<X<2 yuan, and the server may randomly select one from four red envelope amounts: 1.22 yuan, 1.55 yuan, 1.69 yuan, and 1.88 yuan, and send it to a mobile phone of Xiao Ming. After Xiao Ming clicks "Change an amount", the random amount X decreases to less than 1 yuan, and the server may randomly select one from four red envelope amounts: 0.33 yuan, 0.55 yuan, 0.66 yuan, and 0.88 yuan, and send it to the mobile phone of Xiao Ming. If Xiao Ming has not contacted with Xiao Hong on QQ in the last two weeks, the red envelope amount X generated randomly by the server is less than 1 yuan, and the server may randomly select one from the four red envelope amounts: 0.33 yuan, 0.55 yuan, 0.66 yuan, and 0.88 yuan, and send it to the mobile phone of Xiao Ming. After Xiao Ming clicks "Change an amount", the random amount X increases to be satisfied with a condition 1 yuan<X<2 yuan, and the server may randomly select one from four red envelope amounts: 1.22 yuan, 1.55 yuan, 1.69 yuan, and 1.88 yuan, and send it to the mobile phone of Xiao Ming.

The server detects the interactive behavior information between the first account and the second account in the preset time period, and generate a value of the resource according to the interactive behavior information, to approximate an expectation of the value of the resource desired to be transferred by the user, so that the value displayed is likely to meet the user desire, thereby improving accuracy of the value transferred without user intervention.

The first account can make a comment on first information published by the second account anonymously, and further can transfer a resource and leave message (or comment) to the second account at the same time. When the first account want to be anonymous, the second interface of the terminal using the first account for login may display the target information, and on the second interface, the user may enter the message, or may transfer a resource. After the first account transfers the resource or leaves the message to the second account, an interface of the terminal for the first account may be switched from the second interface to the first interface. In this case, the first interface displays the message information, the value of the resource transferred, and the target information. On the interface of the terminal using other accounts except for the first account for login, the message of the first account, the value of the resource transferred, and the target information can be seen, and because the identity information of the first account is in a non-viewable state, other accounts other than the first account cannot learn the identity information of the first account. Thus, the first account can anonymously initiate an event, thereby protecting privacy of the first account and ensuring information security.

Figure 2:
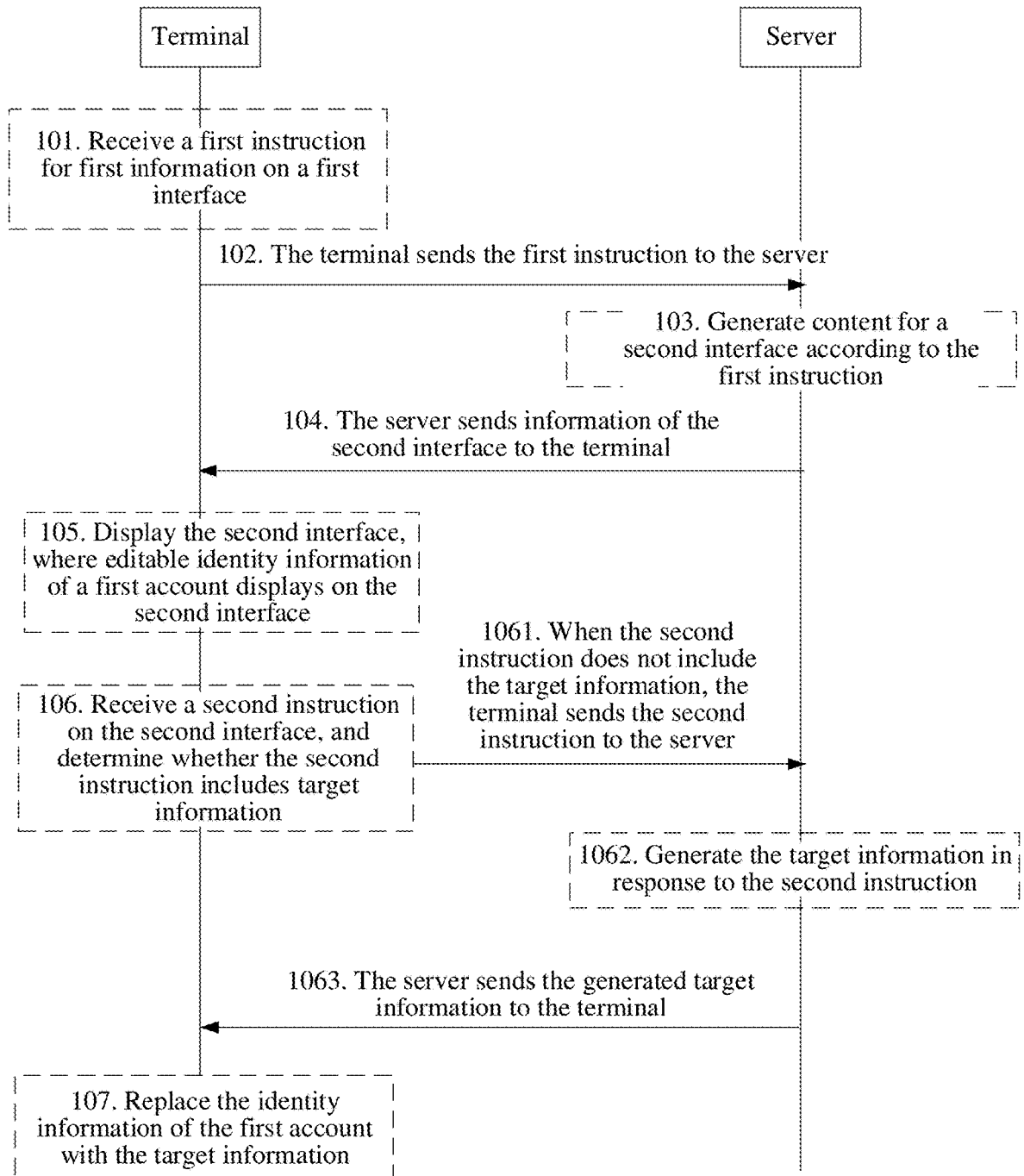
FIG. 2 shows a flowchart of an information updating/exchange method according to an embodiment of this disclosure.

FIG. 2 is a flowchart of an information updating/exchange method according to an embodiment of this disclosure. As shown in FIG. 2, the information updating/exchange method mainly includes steps 101 to 107.

Step 101: A terminal receives a first instruction from a first account associated with first information on a first interface of an application on the terminal.

The first instruction may be used for instructing to execute a preset event for the first information. The first interface may display the first information published by a second account.

Step 102: The terminal sends the first instruction to the server.

Step 103: The server generates information for a second interface according to the first instruction.

Step 104: The server sends the information of the second interface to the terminal.

Step 105: The terminal displays the second interface.

Identity information of the first account is displayed on the second interface, and the identity information of the first account is in an editable state.

Step 106: The terminal receives a second instruction on the second interface, and determines whether the second instruction includes target information.

The second instruction is used for instructing to replace the identity information of the first account with the target information.

Step 106 further includes steps 1061 to 1063.

Step 1061: When the second instruction does not include the target information, the terminal sends the second instruction to the server.

Step 1062: The server generates the target information in response to the second instruction sent by the terminal.

Step 1063: The server sends the generated target information to the terminal.

Step 107: The terminal replaces the identity information of the first account with the target information.

If the second instruction carries the target information, the terminal replaces the identity information of the first account with the target information carried by the second instruction, and if the second instruction does not carry the target information, the identity information of the first account is replaced with the target information sent by the server.

Figure 3:
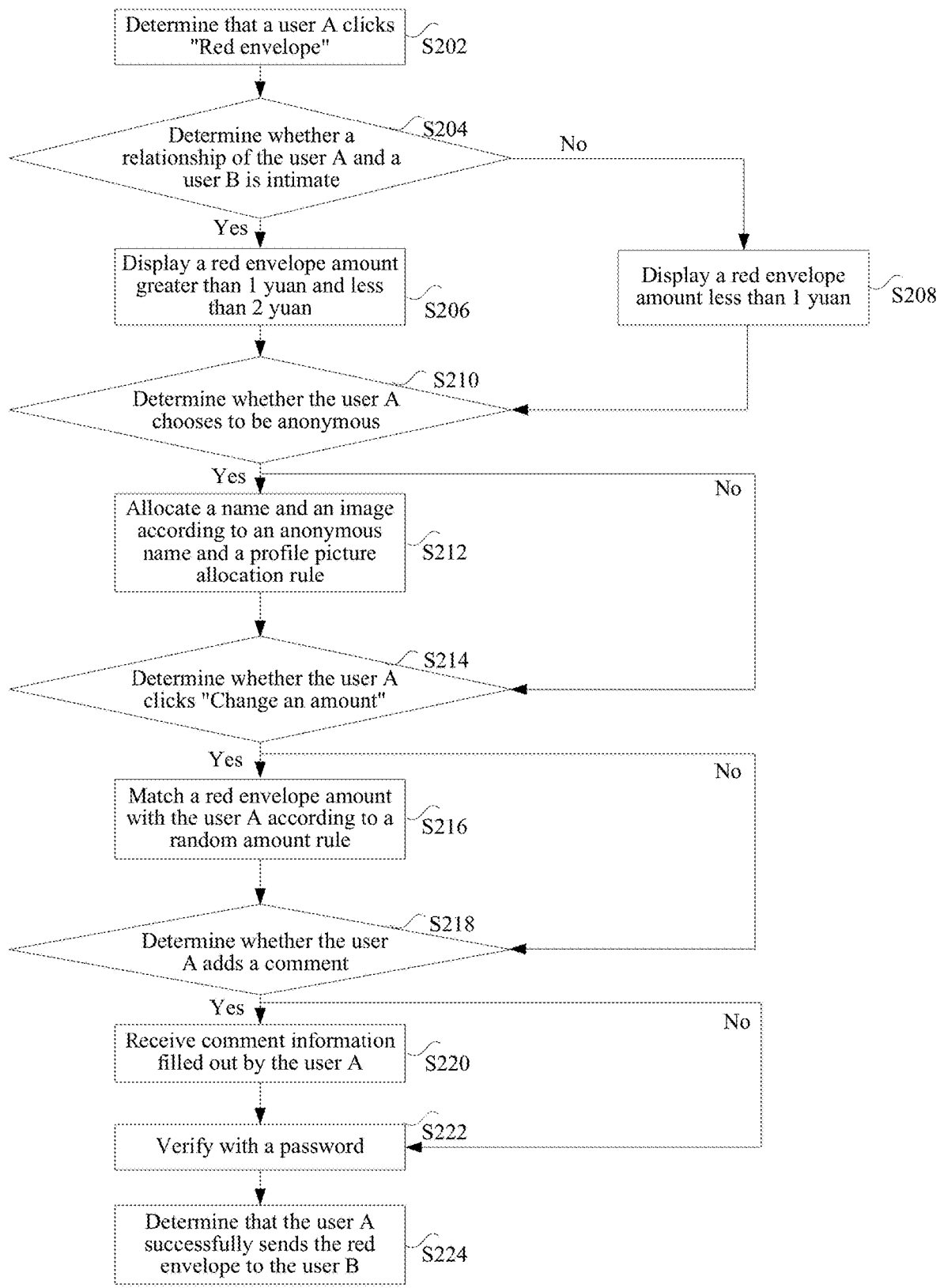
FIG. 3 shows a flowchart of an information updating/exchange method according to another embodiment of this disclosure.
Figure 4:
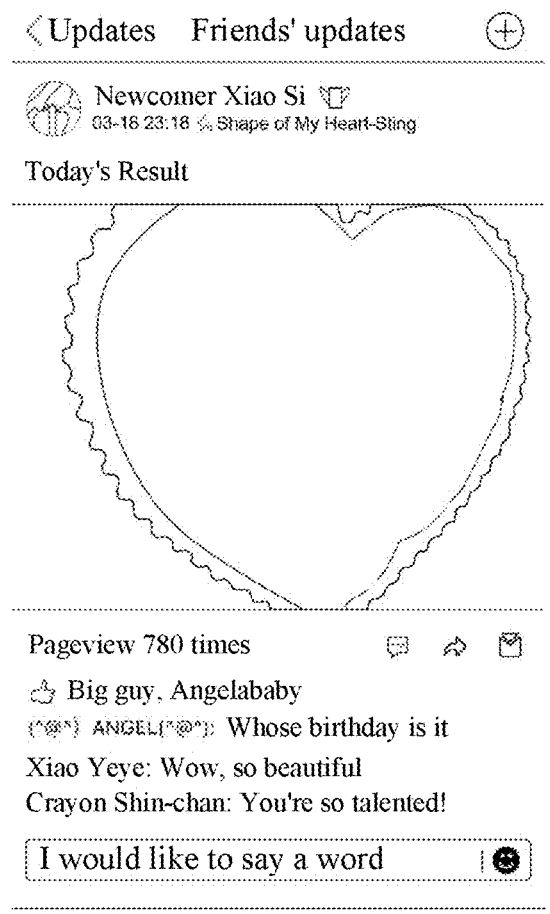
FIG. 4 shows a schematic diagram of a first interface of a terminal according to an embodiment of this disclosure.
Figure 5:
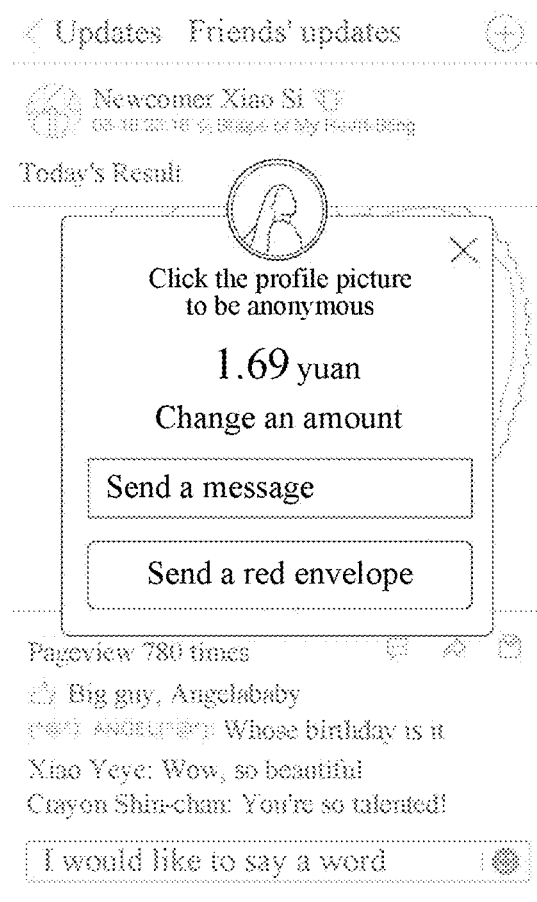
FIG. 5 shows a schematic diagram of a second interface of a terminal according to an embodiment of this disclosure.

FIG. 3 is a flowchart of an information updating/exchange method according to another embodiment of this disclosure. The following describes an information updating/exchange method provided in an embodiment of this disclosure with reference to FIG. 3. As shown in FIG. 3, the information updating/exchange method mainly includes the following steps:

Step S202: Determine that a user A clicks "Red envelope". A terminal of user A uses a first account for login. A second terminal of user B uses a second account for login. As shown in FIG. 4, on a first interface of the terminal of user A, a "red envelope" icon is provided. When user A desires to send a red envelope to user B, user A clicks the "red envelope" icon on the first interface of the terminal of user A, the interface of the terminal of user A switches from the first interface to the second interface, and the second interface is as shown in FIG. 5.

Step 204: Determine whether a relationship of user A and a user B is intimate. If the determined result is yes, perform a step 206; if the determined result is no, perform a step 208.

According to frequency of chatting, giving a like, and/or making a comment between user A and user B, whether a relationship between user A and user B is intimate may be determined, and a random amount is generated according to intimacy degree. If it is determined that the relationship between user A and user B is relatively intimate, the generated random amount is relatively great; otherwise, the generated random amount is relatively small.

Step S206: Display a red envelope amount greater than, e.g., 1 yuan and less than 2 yuan. If it is determined that the relationship between user A and user B is intimate, the generated random amount may be between 1 yuan to 2 yuan. For example, if it is determined that the relationship between user A and user B is intimate, the generated random amount is 1.69 yuan, as shown in FIG. 5. In FIG. 5, it may be seen that, a line of texts or a button "Change an amount" is provided under "1.69 yuan". If user A clicks the line of the texts or button, "1.69 yuan" may be updated to another amount.

Step S208: Display a red envelope amount less than 1 yuan. In step S204, if it is determined that the relationship between user A and user B is relatively not intimate, the generated random amount may be less than 1 yuan.

Step S210: Determine whether user A chooses to be anonymous. If the determined result is yes, perform a step S212; if the determined result is no, perform a step S214.

Figure 6:
FIG. 6 shows a schematic diagram of using an anonymous identity information on a second interface of a terminal according to an embodiment of this disclosure.

Step S212: Allocate a name and an image according to an anonymous name and profile picture allocation rule. As shown in FIG. 5, a line of texts or button "Click the profile picture to be anonymous" is provided under the first account. If user A clicks the line of the texts or button, the profile picture of user A on the second interface of the terminal is updated to a celebrity profile picture (such as a profile picture of a celebrity W), and "Being anonymous as W" is displayed under the profile picture. If the user does not like celebrity W, the profile picture of celebrity W may be clicked. In this case, the profile picture of celebrity W is replaced with the identity information of the first account. If the user continues click the identity information of the first account, the identity information of the first account may be replaced with a profile picture of another celebrity (such as a profile picture of celebrity L), and "Being anonymous as L" is displayed under the profile picture. If user A is still not satisfied, the profile picture of celebrity L may be clicked. In this case, the profile picture of the celebrity L is replaced with identity information of the first account. If the user continues click the identity information of the first account, the identity information of the first account is replaced with a profile picture of another celebrity until the user is satisfied. For example, as shown in FIG. 6, the profile picture of user A on the second interface of the terminal is replaced with a profile picture of celebrity xxx, and "Being anonymous as xxx" is displayed under the profile picture.

Step S214: Determine whether user A clicks "Change an amount". If the determined result is yes, perform a step S216; if the determined result is no, perform a step S218. If the user is not satisfied with the red envelope amount, "Change an amount" button on an interface as shown in FIG. 6 may be clicked.

Figure 7:
FIG. 7 shows a schematic diagram after a red envelope amount is replaced on a second interface of a terminal according to an embodiment of this disclosure.

Step S216: Match a red envelope amount with user A according to a random amount rule. If the user clicks "Change an amount" on an interface as shown in FIG. 6, a rule that more amount is suggested if the relationship is intimate and less amount is suggested if the relationship is not intimate may be used to generate a red envelope amount to user A. Specifically, if it is determined that the relationship between user A and user B is relatively intimate in step S204, an amount is randomly selected from some relative large red envelope amount for displaying to user A. If it is determined that the relationship between user A and user B is relatively not intimate in step S204, an amount is randomly selected from some relative small red envelope amount for displaying to user A. For example, if it is determined that the relationship between user A and user B is relatively intimate in step S204, an amount is randomly selected from: 1.22 yuan, 1.55 yuan, 1.69 yuan, and 1.88 yuan for displaying to user A. If it is determined that the relationship between user A and user B is relatively not intimate in step S204, an amount is randomly selected from: 0.33 yuan, 0.55 yuan, 0.66 yuan, and 0.88 yuan for displaying to user A. It is assumed that it is determined that the relationship between user A and user B is relatively intimate in step S204, 1.88 yuan is randomly selected as the red envelope amount for displaying to user A, as shown in FIG. 7, the red envelope amount is updated to 1.88 yuan.

Figure 8:
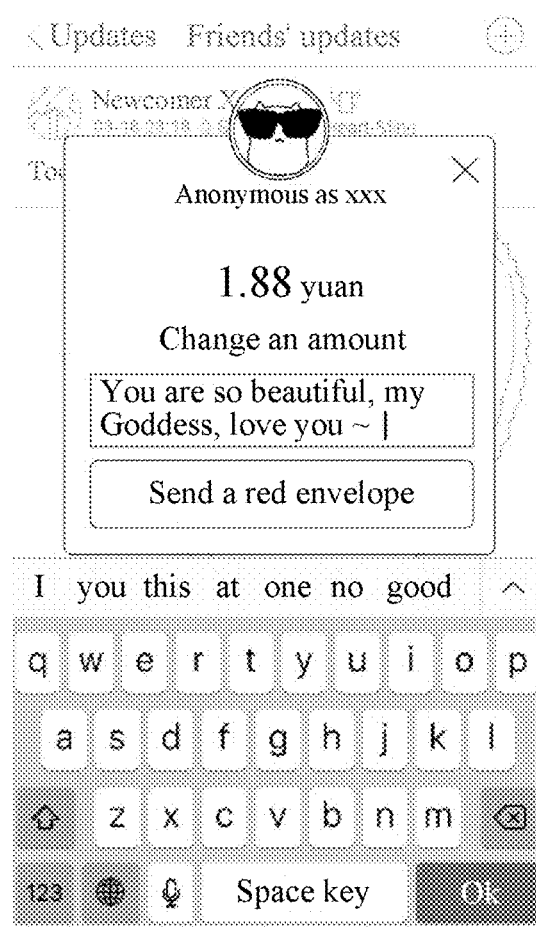
FIG. 8 shows a schematic diagram of adding a comment on a second interface of a terminal according to an embodiment of this disclosure.

Step S218: Determine whether user A adds a comment. If the determined result is yes, perform a step S220; if the determined result is no, perform a step S222. After user A clicks a "Send a message" block on the interface as shown in FIG. 7, a comment may be added. For example, after user A clicks the "Send a message" block on the interface as shown in FIG. 7, the interface is replaced with an interface as shown in FIG. 8, a comment may be entered by user A. It is assumed that user A fills comment information "You are so beautiful, my Goddess, love you" out.

Step S220: Receive comment information filled by user A.

Figure 9:
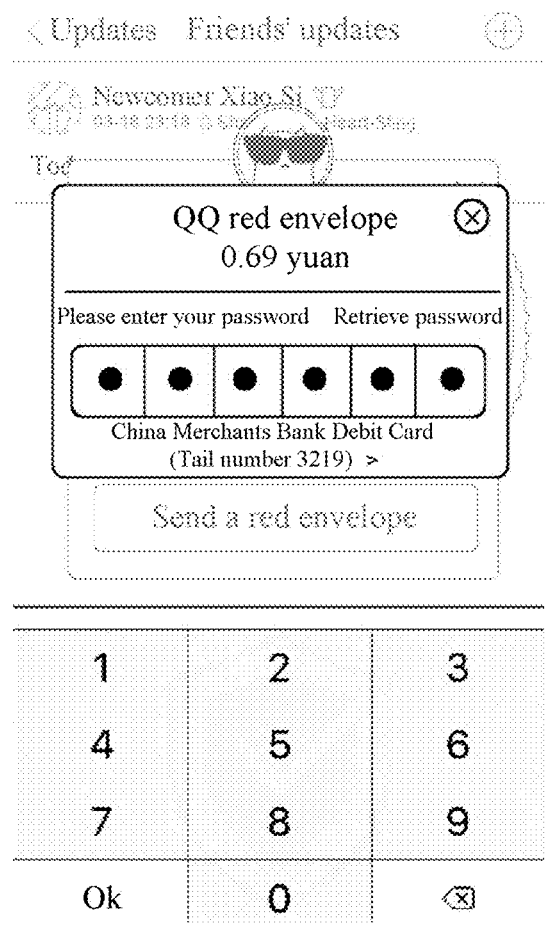
FIG. 9 shows a schematic diagram of entering a payment password on a second interface of a terminal according to an embodiment of this disclosure.

Step S222: Verify with a password. When the user clicks "Send a red envelope" block as shown in FIG. 8, the interface is switched to an interface as shown in FIG. 9. User A can enter a payment password on the interface. The password entered is sent to a payment server, after the payment password is authenticated by the payment server, a payment operation is completed, and an interface displaying "Payment succeeds" may be shown on the terminal.

Figure 10:
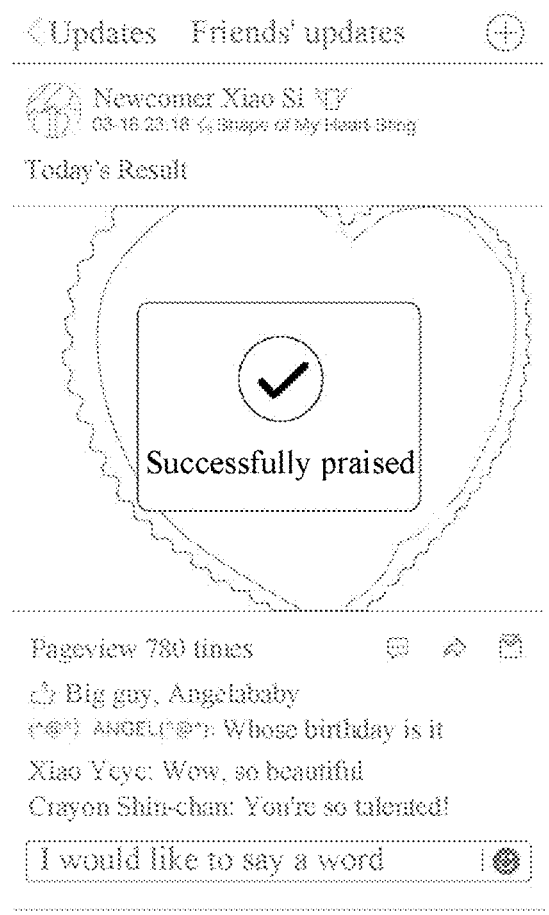
FIG. 10 shows a schematic diagram of prompting a successfully praising donation event on an interface of a terminal according to an embodiment of this disclosure.
Figure 11:
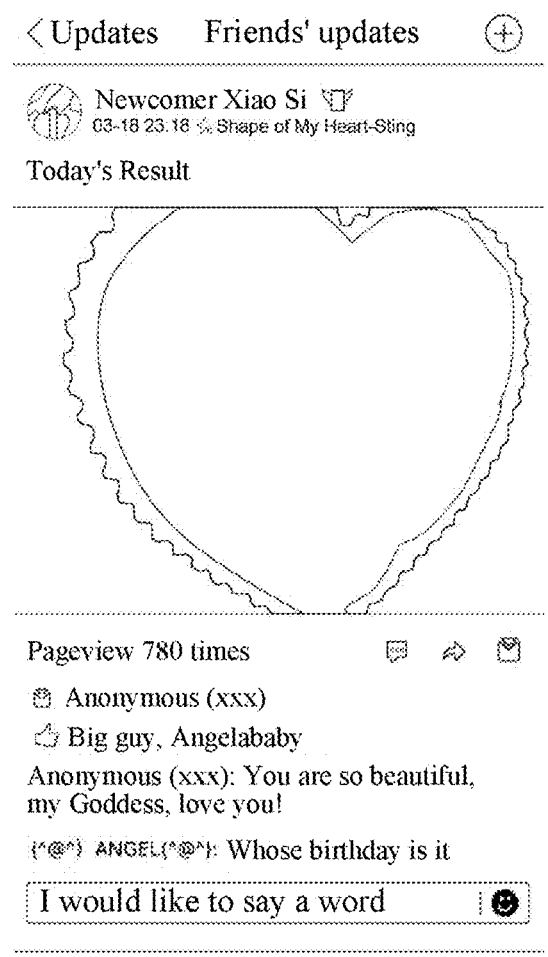
FIG. 11 is a schematic diagram of an interface on which an anonymous comment is made according to an embodiment of this disclosure.
Figure 12:
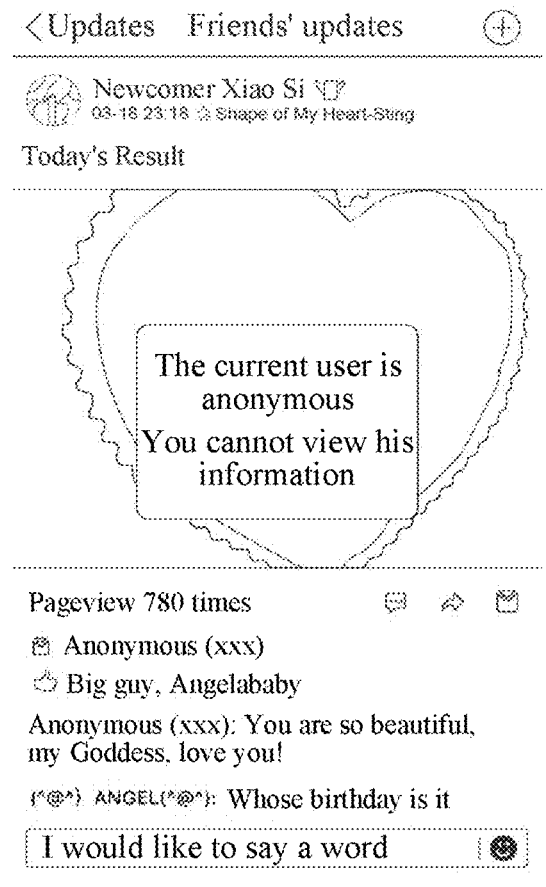
FIG. 12 is a schematic diagram of an interface on which identity information of a first account is viewed by using a terminal according to an embodiment of this disclosure.

Step S224: Determine that user A successfully sends the red envelope to user B. After the payment password is authenticated, the terminal receives a "Successfully paid" interface returned by the server and displays an interface as shown in FIG. 10 (that is, the successfully paid interface), and a "Successfully praised" prompt block is displayed on the interface. Several seconds later, the prompt block disappears and a red envelope icon appears, as shown in FIG. 11, and "Anonymous(xxx)" appears on the right side of, and a comment "You are so beautiful, my Goddess, love you" of the "Anonymous(xxx)" appears under the red envelope icon. A prompt indicating that "The current user is anonymous and you cannot view his information" appears when other users other than user A click a text link "Anonymous(xxx)", as shown in FIG. 12.

In an embodiment of this disclosure, an anonymous event can be initiated by the user, thereby achieving a technology effect of protecting user privacy and ensuring user information security.

A description for the information updating/exchange method using a comment event as an example is as follows.

For example, Xiao Zhang and kiki are friends, and Xiao Zhang pays close attention to an update of a QQ space of kiki. When kiki posts a new update each time, Xiao Zhang makes a comment or gives a "like". However, Xiao Zhang does not want other persons to know that Xiao Zhang is in unrequited love with kiki By using a method provided in the implementations of this disclosure, Xiao Zhang can make a comment or give a like on the update of kiki anonymously. Detailed scenarios are as follows:

Kiki publishes a photo of kiki in QQ space of kiki (first information published by a second account), a QQ application client in a computer of Xiao Zhang displays a new update of kiki, Xiao Zhang enters the QQ client via a first account and sees the photo of kiki (the first information published by the second account displaying on a first interface of a terminal), Xiao Zhang sends a first instruction to a server, and the first instruction is used for making a comment of the photo of kiki (making the comment on the photo of kiki, that is, initiates an comment event associated with the first information above). The computer of Xiao Zhang displays an editable interface (the second interface), and identity information of Xiao Zhang is displayed on the interface. Xiao Zhang clicks the interface, to send a second instruction to the server, the server receives the second instruction, to send an image and a name of a celebrity A to the computer of Xiao Zhang, and on the second interface of the terminal. The identity information of Xiao Zhang is replaced with the image and the name of the celebrity A Kiki may see the comment of Xiao Zhang and the image of the celebrity A in the QQ client of kiki via the second account, but cannot learn an identity of the commenter (Xiao Zhang). Persons other than Xiao Zhang may just see content of the comment, but cannot learn the identity of the commenter, thereby achieving a technology effect of making a comment or giving a like anonymously.

A description for the information updating/exchange method in an example in which a donation event is made anonymous is as follows.

Xiao Hu publishes a text (first information published by a second account) in a microblog of Xiao Hu for calling for donation of money, Xiao Wang sees the text (the first information published by the second account displaying on a first interface of a terminal) in a microblog of Xiao Wang, Xiao Wang sends a first instruction to a server, the first instruction is used for donating money to Xiao Hu (donation event associated with the first information above). The server generates a second interface according to the first instruction, and sends information of the second interface to a mobile phone of Xiao Wang. The mobile phone of Xiao Wang displays an editable interface (the second interface), and identity information of Xiao Wang is displayed on the interface. Xiao Wang clicks the interface, to send a second instruction to the server, the server receives the second instruction, to send an image and a name of a celebrity B to the mobile phone of Xiao Wang, and on the second interface of the terminal, the identity information of Xiao Wang is replaced with the image and the name of the celebrity B. If Xiao Wang is not satisfied with a donation amount, Xiao Wang may edit the donation amount. Xiao Wang further may edit a message accompanying the donation. After Xiao Wang donates money successfully, Xiao Hu may see the donation, the message of Xiao Wang and the image of the celebrity B in the microblog of Xiao Hu, but cannot learn an identity of the donor. Persons other than Xiao Wang may just see donation information, but cannot learn the identity of the donor, thereby protecting privacy of the donor and ensuring information security of the donor.

By using the information updating/exchange method provided in an embodiment of this disclosure, Events i such as make a comment on, give a reply to or give a like for a message of certain member in a group may be initiated anonymously. The group may be a WeChat group, a QQ group or the like. The following is an example in which an event of making a comment anonymously on a message of certain member in a group is initiated.

For example, Jia and Yi are in a same WeChat group, Yi sends a message "Let's go for a ride this weekend" in the WeChat group (first information published by a second account). A message item containing Yi's message in an WeChat account of Jia on a mobile phone of Jia may appear and be seen by Jia (first information published by a second account displaying on a first interface of a terminal), Jia may click the message published by Yi to generate a first instruction, and make a comment on the message published by Yi (an event associated with the first information). The server generates a second interface according to the first instruction, and sends information of the second interface to a mobile phone of Jia. The mobile phone of Jia displays an editable interface (the second interface), and identity information of Jia is displayed on the interface. Jia clicks the interface, to send a second instruction to the server (instructing to change identity information of Jia), and the server receives the second instruction, and sends an image of the celebrity B to the mobile phone of Jia. Identity information of Jia on the second interface of the mobile phone of Jia is replaced with the image and the name of the celebrity B, and Jia further may make a comment on the second interface on the message published by Yi. For example, comment content of Jia on the second interface on the message published by Yi may be "That's a good idea!" After Jia completes the comment, Everyone in the WeChat group may see the comment "That's a good idea!" on the message "Let's go for a ride this weekend" of Yi together with the image and the name of the celebrity B. When the image of the celebrity B is clicked, a prompt "The identity information is in a non-allowed state" may be displayed for members of the group other than Jia, thereby achieving a technology effect of making a comment anonymously in a group.

It should be noted that, to simplify the description, the foregoing method embodiments and implementations are described as a series of steps. But a person of ordinary skill in the art should understand that the present disclosure is not limited to any described sequence of the steps, as some steps can adopt other sequences of steps. Some steps maybe performed simultaneously or in other orders according to the present disclosure. Further, a person of ordinary skill in the art should understand that the embodiments and implementations described in the specification are merely exemplary and not all components or steps need to be included in an implementation.

Through the foregoing description of the exemplary implementations, it is clear to a person of ordinary skill in the art that the present disclosure may be implemented by software in combination with a hardware platform, and may alternatively be implemented by hardware alone. In many cases, software implementations may be preferred. Based on such an understanding, the technical solutions of this disclosure or the parts that contribute to the existing technology may be substantially embodied in form of a computer software product. The computer software product may be stored in a storage medium (for example, a ROM/RAM, a magnetic disk, or an optical disc), and contains computer instructions for a terminal device (which may be a mobile phone, a personal computer, a server, or a network device) to perform the method according to the embodiments of this disclosure.

In some implementations, an information updating/exchange apparatus is further provided for implementing the information updating/exchange method described above.

Figure 13:
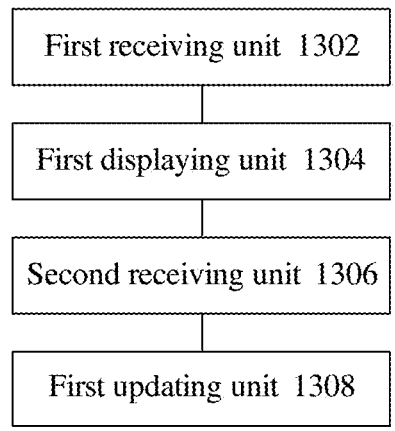
FIG. 13 is a schematic diagram of an information updating/exchange apparatus according to an embodiment of this disclosure.

FIG. 13 shows a schematic diagram of an information updating/exchange apparatus according to this embodiment of this disclosure, and as shown in FIG. 13, the information updating/exchange apparatus may include:

a first receiving unit 1302, configured to receive a first instruction for first information on a first interface of an application running on the apparatus. The apparatus may be used for logging into a first account associated with the application. The first instruction may be used for initiating a preset event associated with the first information. The first information may be published by a second account associated with the application and being displayed on the first interface;

a first displaying unit 1304, configured to display a second interface in response to the first instruction, the second interface displaying identity information of the first account, and the identity information of the first account being in an editable state;

a second receiving unit 1306, configured to receive a second instruction on the second interface, the second instruction being used for instructing to replace the identity information of the first account with target information; and a first updating unit 1308, configured to update the identity information of the first account displayed on the second interface to the target information according to the second instruction.

In some implementations, the apparatus may further include: a third receiving unit, configured to receive a third instruction on the second interface, after the first updating unit updates the identity information of the first account displayed on the second interface with the target information according to the second instruction, the third instruction being used for replacing the target information with the identity information of the first account. The apparatus may further include a second updating unit configured to replace the target information displayed on the second interface with the identity information of the first account.

In some implementations, when the first updating unit updates the identity information of the first account displayed on the second interface to the target information according to the second instruction, the first displaying unit displays first prompt information on the second interface, the first prompt information being used for indicating that the identity information of the first account is in a hidden state. When the first updating unit updates the target information displayed on the second interface to the identity information of the first account according to the second instruction, the first displaying unit displays the second prompt information on the second interface, the second prompt information being used for indicating that the identity information of the first account is in a viewable state.

In some implementations, the apparatus may further include a first detection unit, configured to detect whether the second instruction carries the target information, after the second receiving unit receives the second instruction on the second interface, and before the first updating unit updates the identity information of the first account displayed on the second interface to the target information according to the second instruction. The apparatus may further include a third updating unit configured to update the identity information of the first account displayed on the second interface to the target information carried by the second instruction, if it is detected that the second instruction carries the target information.

In some implementations, the apparatus may further include a second detection unit, configured to detect whether the second instruction carries the target information, after the second receiving unit receives the second instruction on the second interface, and before the first updating unit updates the identity information of the first account displaying on the second interface to the target information according to the second instruction. The apparatus may further include a first sending unit, configured to send the second instruction to the server, if it is detected that the second instruction does not carry the target information. The apparatus may further include a fourth receiving unit, configured to receive the target information generated by the server in response to the second instruction, the server randomly extracting a first group from preset identity information groups and randomly extracting a piece of identity information as the target information from the first group.

In some implementations, the preset event may be an event of transferring a resource, and the apparatus may further include a second sending unit, configured to send the first instruction to the server, after the first receiving unit receives the first instruction on the first interface of the apparatus, the first instruction being used for instructing to execute the preset event associated with the first information. The apparatus may further include a fifth receiving unit configured to receive a value of a to-be-transferred resource sent by the server in response to the first instruction and a second displaying unit configured to display the value of the to-be-transferred resource on the second interface, the displayed value of the to-be-transferred resource being in an editable state.

In some implementations, the preset event may be an event of transferring a resource, and the apparatus may further include a third detection unit configured to detect interactive behavior information between the first account and the second account in a preset time period after the second sending unit sends the first instruction to the server, and before the fifth receiving unit receives the value of the to-be-transferred resource sent by the server in response to the first instruction. The apparatus may further include a generating unit, configured to generate, by the server, a value of the to-be-transferred resource according to the interactive behavior information, the value of the generated to-be-transferred resource being greater than or equaling to a first value when the interactive behavior information satisfies a preset condition, and the value of the generated to-be-transferred resource being less than the first value when the interactive behavior information does not satisfy the preset condition.

In some implementations, the apparatus may further include a sixth receiving unit, configured to receive message information on the second interface, after the first displaying unit displays the second interface in response to the first instruction. When the resource is transferred from the first account to the second account, the message information and the target information are displayed on the first interface, and the identity information of the first account is in a hidden state.

Figure 14:
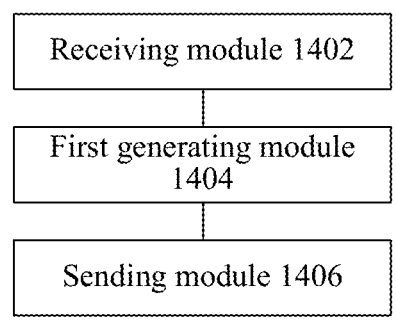
FIG. 14 is a schematic diagram of a server for implementing an information updating/exchange method according to an embodiment of this disclosure.

FIG. 14 shows a schematic diagram of a server for implementing an information updating/exchange method according to an embodiment of this disclosure. As shown in FIG. 14, the sever mainly includes:

a receiving module 1402, configured to receive a request for replacing identity information of a first account to target information, the request for replacing identity information being sent by using a second interface by a terminal using a first account for login, the terminal displaying the second interface after receiving the first instruction on the first interface, the first instruction being used for instructing to execute a preset event associated with the first information, the first interface displaying the first information published by a second account, the second interface displaying the identity information of the first account, and the identity information of the first account being in an editable state;

a first generating module 1404, configured to generate the target information according to the request for replacing identity information; and a sending module 1406, configured to send, by the server, the target information to the terminal using the first account for login.

In some implementations, the first generating module may include a first extracting submodule, configured to randomly extract a first group from a preset identity information groups, the preset identity information groups each including multiple pieces of identity information; and a second extracting submodule, configured to randomly extracting a piece of identity information from the first group as the target information.

In some implementations, the server may further include a detection module, configured to detect interactive behavior information between the first account and the second account in a preset time period, before the receiving module receives the request for replacing identity information of the first account with the target information. The server may further include a second generating module configured to generate a value of a to-be-transferred resource according to the interactive behavior information, the value of the generated to-be-transferred resource being greater than or equaling to a first value when the interactive behavior information satisfies a preset condition, or the value of the generated to-be-transferred resource being less than the first value when otherwise.

Figure 15:
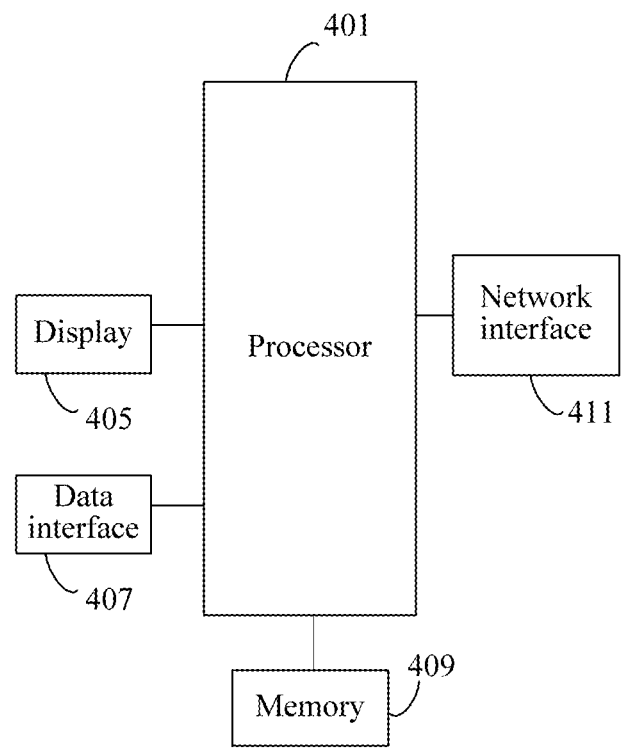
FIG. 15 is a schematic diagram of a terminal for implementing an information updating/exchange method according to an embodiment of this disclosure.

In some implementations, a terminal is further provided for implementing the information updating/exchange method. As shown in FIG. 15, the terminal mainly includes: a processor 401, a display screen 405, a data interface 407, a memory 409 and a network interface 411.

The data interface 407 transfers identity information of a first account to a server.

The memory 409 may be used for storing multiple pieces of target information.

The network interface 411 may be used for performing network communications with one or more servers.

The display screen 405 may be used for displaying a first interface or a second interface of the application on the terminal.

The processor 401 may be used for executing computer instructions to perform the following operations:

receiving a first instruction on the first interface of the terminal, the first instruction being used for instructing to execute a preset event associated with the first information, and the first interface displaying first information published by the second account; displaying the second interface in response to the first instruction, the second interface displaying the identity information of the first account, and the identity information of the first account is in an editable state; receiving a second instruction on the second interface, the second instruction being used for instructing to replace the identity information of the first account with the target information; and updating the identity information of the first account displayed on the second interface to the target information according to second instruction.

The processor 401 may be further used for receiving a third instruction on the second interface, the third instruction being used for replacing the target information with the identity information of the first account and updating the target information displayed on the second interface to the identity information of the first account.

The processor 401 may be further used for: displaying first prompt information on the second interface for indicating that the identity information of the first account is in a hidden state when the identity information of the first account displayed on the second interface is updated to the target information according to the second instruction, and for displaying second prompt information on the second interface for indicating that the identity information of the first account is in a viewable state when the target information displayed on the second interface is updated to the identity information of the first account according to the second instruction.

The processor 401 may be further used for: detecting whether the second instruction carries the target information; updating the identity information of the first account displayed on the second interface to the target information carried by the second instruction when it is detected that the second instruction carries the target information.

The processor 401 may be further used for: detecting whether the second instruction carries the target information; sending the second instruction to the server when it is detected that the second instruction does not carry the target information; receiving target information generated by the server in response to the second instruction where the server randomly extracts a first group from a preset identity information groups and randomly extracts a piece of identity information from the first group as target information.

The processor 401 may be further used for: sending the first instruction to the server, the first instruction being used for instructing to execute a preset event associated with the first information; receiving the value of the to-be-transferred resource sent by the server in response to the first instruction; displaying the value of the to-be-transferred resource on the second interface, the value of the to-be-transferred resource being in an editable state.

The processor 401 may be further used for: detecting interactive behavior information between the first account and the second account in a preset time period; generating the value of the to-be-transferred resource according to the interactive behavior information, the value of the generated to-be-transferred resource being greater than or equaling to a first value when the interactive behavior information satisfies a preset condition, and the value of the generated to-be-transferred resource being less than the first value when the interactive behavior information does not satisfy the preset condition.

The processor 401 may be further used for receiving message information on the second interface. When the resource is transferred from the first account to the second account, the message information and the target information may be displayed on the first interface and the identity information of the first account may be in a hidden state.

The processor 401 may be further used for receiving a request for replacing identity information of the first account with the target information, the request being sent by using the second interface on the terminal using the first account for login. The terminal may display the second interface after receiving the first instruction on the first interface, the first instruction being used to instruct to execute a preset event associated with the first information. The first interface may display the first information published by a second account. The second interface may display the identity information of the first account and the identity information of the first account may be in an editable state.

The processor 401 may be further used for: randomly extracting a first group from preset identity information groups, each of the preset identity information group including multiple pieces of the identity information; and randomly extracting a piece of the identity information from the first group as the target information.

The processor 401 may be further used for: detecting interactive behavior information between the first account and the second account in a preset time period; generating the value of the to-be-transferred resource according to the interactive behavior information, the value of the generated to-be-transferred resource being greater than or equal to a first value when the interactive behavior information satisfies a preset condition, and the value of the generated to-be-transferred resource being less than the first value when the interactive behavior information does not satisfy the preset condition.

This disclosure further provides a storage medium. In some implementations, the storage medium described above may be used for storing program code and instructions for the information updating/exchange method disclosed above.

In some implementations, the storage medium described above may locate in at least one network device of multiple network devices in the network of a mobile communication network, a wide area network, a metropolitan area network or a local area network.

In some implementations, the storage medium is configured to store program code which, when executed by a device, causes the device to:

S1: Receive a first instruction on a first interface of a terminal, the first instruction being used for instructing to execute a preset event associated with first information, and the first interface for displaying the first information published by a second account;

S2: Display a second interface in response to the first instruction, the second interface displaying identity information of the first account, and the identity information of the first account being in an editable state;

S3: Receive a second instruction on the second interface, the second instruction being used for instructing to replace the identity information of the first account with target information.

S4: Update the identity information of the first account displayed on the second interface to the target information according to the second instruction.

In some implementations, the storage medium described above may include but is not limited to: any medium that can store program code, such as a USB flash drive, a read-only memory (ROM), a random access memory (RAM), a removable hard disk, a magnetic disk, or an optical disc. The storage medium may be non-transitory.

In some implementations, the processor performs, according to the program code stored in the storage medium, the following steps: receiving a third instruction on the second interface, the third instruction being used for replacing the target information with the identity information of the first account; and updating the target information displayed on the second interface to the identity information of the first account.

In some implementations, the processor performs, according to the program code stored in the storage medium, the following steps: when the identity information of the first account displayed on the second interface is updated to the target information according to the second instruction, displaying first prompt information on the second interface for indicating that the identity information of the first account is in a hidden state; when the target information displayed on the second interface is updated to the identity information of the first account according to the second instruction, displaying second prompt information on the second interface for indicating that the identity information of the first account is in a viewable state.

In some implementations, the processor performs, according to the program code stored in the storage medium, the following steps: detecting whether the second instruction carries the target information; updating the identity information of the first account displaying on the second interface to the target information carried by the second instruction when it is detected that the second instruction carries the target information.

In some implementations, the processor performs, according to the program code stored in the storage medium, the following steps: detecting whether the second instruction carries the target information; sending the second instruction to the server when it is detected that the second instruction does not carry the target information; receiving the target information generated by the server in response to the second instruction, where the server randomly extracts a first group from preset identity information groups and randomly extracting a piece of identity information from the first group as the target information.

In some implementations, the processor performs, according to the program code stored in the storage medium, the following steps: sending the first instruction to the server, the first instruction being used for instructing to execute a preset event associated with first information; receiving the value of the to-be-transferred resource sent by the server in response to the first instruction; and displaying the value of the to-be-transferred resource on the second interface, the value of the to-be-transferred resource being in an editable state.

In some implementations, the processor performs, according to the program code stored in the storage medium, the following steps: detecting interactive behavior information by the server between the first account and the second account in a preset time period; and generating the value of the to-be-transferred resource according to the interactive behavior information, the value of the generated to-be-transferred resource being greater than or equaling to a first value when the interactive behavior information satisfies a preset condition, and the value of the generated to-be-transferred resource being less than the first value when the interactive behavior information does not satisfy the preset condition.

In some implementations, the processor performs, according to the program code stored in the storage medium, the following step: receiving message information, where the message information and target information is displayed on the first interface, after a resource is transferred from a first account to a second account, the identity information of the first account being in a non-allowed state.

In some implementations, the storage medium is set to store program code used for executing the following program code:

S1: Receive a request for replacing identity information of a first account with identity information of a target information, the request being sent by using a second interface by a terminal logged in to a first account, the terminal displaying the second interface after receiving the first instruction on the first interface, the first instruction being used to instruct to execute a preset event associated with the first information, the first interface displaying the first information published by a second account, the second interface displaying the identity information of the first account, and the identity information of the first account being in an editable state.

S2: Generate the target information according to the request for replacing identity information.

S3: Send the target information to the terminal using the first account for login.

In some implementations, according to the program code stored in the storage medium, the processor may execute these steps: randomly extract a first group from preset identity information groups, each of the preset identity information group including multiple pieces of the identity information; and randomly extract a piece of the identity information from the first group as the target information.

In some implementations, according to the program code stored in the storage medium, the processor executes these steps: detect interactive behavior information between the first account and the second account in a preset time period; and generate the value of the to-be-transferred resource according to the interactive behavior information, the value of the generated to-be-transferred resource being greater than or equaling to a first value when the interactive behavior information satisfies a preset condition, and the value of the generated to-be-transferred resource being less than the first value when the interactive behavior information does not satisfy the preset condition.

The sequence numbers of the preceding embodiments and implementations of this disclosure are merely for description purpose but do not indicate any preference in order.

When the integrated unit in the foregoing disclosure is implemented in a form of a software functional module and sold or used as an independent product, the integrated unit may be stored in the foregoing computer-readable storage medium. Based on such an understanding, the technical solutions of this disclosure may be implemented in a form of a software product. The computer software product may be stored in a storage medium and includes instructions for instructing one or more computer devices (which may be a personal computer, a server, a network device, or the like) to perform all or some of the steps of the methods described above.

In the foregoing embodiments and implementation of this disclosure, various aspects of the implementations are emphasized, and as for parts that are not described in detail in one particular implementation, reference can be made to the relevant description for other embodiments and implementations.

The methods, apparatus, and devices described above are merely examples and may be implemented in other similar manners. For example, the division between units is merely exemplary and other manners of division may be implemented. For example, multiple units or components may be combined or integrated into another unit. Some features of a unit or an entire unit may be omitted. In addition, the illustrated or discussed mutual couplings or direct couplings or communication connections between components may be implemented by using any suitable interfaces. The indirect couplings or communication connections between the units or modules may be implemented in electronic, mechanical, or other forms.

The units described as separate parts may be or may not be physically separate, and parts illustrated as units may be or may not be physical units, e.g., they may be located in one position, or may be distributed as a plurality of network unit. Some or all of the units may be selected according to actual requirements to achieve the objectives of the solutions of this disclosure.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

The above descriptions are merely preferred embodiments of this disclosure, and it should be noted that, a person of ordinary skill in the art may make various improvements and refinements without departing from the spirit of this disclosure. All such modifications and refinements are within the scope of this disclosure.

What is claimed is:

1. An information updating and exchange method, comprising:
    accessing, from an application running on a terminal device having a processor, a remote information exchange platform via a first user account;
    receiving, by the terminal device, a first information posted from a second user account of the remote information exchange platform;
    displaying the first information on a first user interface of the application on the terminal device;
    receiving, via the first user interface, a first user instruction associated with the first information for initiating a preset exchange event of resource transfer from the first user account to the second user account associated with the first information;
    sending, by the terminal device, the first user instruction to a server for initiating the resource transfer;
    receiving, by the terminal device, a value associated with the resource transfer from the server, wherein the value is generated by the server according to an interactive behavior information between the first user account and the second user account, wherein the interactive behavior is detected by the server during a preset time period, and wherein the value is greater than or equal to a first reference value when the interactive behavior information satisfies a preset condition and is less than the first reference value when the interactive behavior information does not satisfy the preset condition;
    generating, by the terminal device in response to the first user instruction, a second user interface for displaying an identity information of the first user account in an editable mode;
    receiving, via the second user interface, a second user instruction for using a target identity information to hide the identity information of the first user account temporarily during the preset exchange event of resource transfer;
    detecting, by the terminal device, whether the second user instruction carries the target identity information; and
    when the terminal device detects that the second user instruction does not carry the target identity information:
        sending, by the terminal device, the second user instruction to a server;
        receiving, by the terminal device, the target identity information generated by the server in response to the second user instruction, wherein the server randomly extracts a first group from preset identity information groups and randomly extracts a piece of identity information comprising a celebrity's name from the first group as the target identity information; and
        displaying, by the terminal device, the target identity information in place of the identity information of the first user account displayed on the second user interface.

2. The method according to claim 1, further comprising:
    receiving, via the second user interface, a third instruction for replacing the target identity information with the identity information of the first user account; and
    updating, by the terminal device, the target identity information displayed on the second user interface to the identity information of the first user account.

3. The method according to claim 2, further comprising:
    displaying, on the second user interface when displaying the target identity information in place of the identity information of the first user account, a first prompt information for indicating that the identity information of the first user account is hidden from view for other user accounts of the remote information exchange platform; and
    displaying, on the second user interface when updating the target identity information to identity information of the first user account, a second prompt information for indicating that the identity information of the first user account is viewable for other user accounts of the remote information exchange platform.

4. The method according to claim 1, wherein, after detecting whether the second user instruction carries the target identity information, the method further comprises:
    updating the identity information of the first user account displayed on the second user interface to the target identity information carried in the second user instruction when it is detected that the second user instruction carries the target identity information.

5. The method according to claim 1, wherein, after displaying the second user interface in response to the first user instruction, the method further comprises:
    receiving, by the terminal device, a comment message associated with the first information on the second user interface; and
    displaying the comment message and the target identity information to the second user account when the resource transfer from the first user account to the second user account is completed, wherein the identity information of the first user account is hidden from other user accounts of the remote information exchange platform.

6. An information updating and exchange method, comprising:
    providing, by a server of an information exchange platform, a first user account and a second user account for accessing the information exchange platform;
    receiving a first message by the server from a second terminal device in communication with the information exchange platform via the second user account;
    sending, by the server, the first message to a first terminal device in communication with the information exchange platform via the first user account;
    receiving, by the server from the first terminal device via the first user account, a request for using a target identity information to hide an identity information of the first user account temporarily during a preset exchange event of resource transfer from the first user account to the second user account, wherein the request is sent from the first terminal device via the first user account upon displaying a second user interface on the first terminal device in response to receiving a first user instruction for initiating the preset exchange event associated with the first message on a first user interface on the first terminal device associated with the information exchange platform, and wherein the second user interface of the first terminal device displays the identity information of the first user account in an editable mode;
    extracting, by the server, a first group from preset identity information groups, each group comprising multiple pieces of identity information;
    extracting, by the server, one piece of identity information comprising a celebrity's name from the first group as the target identity information;

detecting, by the server, interactive behavior information between the first user account and the second user account during a preset time period:

generating, by the server, a value associated with the resource transfer according to the interactive behavior information, wherein the value associated with the resource transfer is greater than or equal to a first reference value when the interactive behavior information satisfies a preset condition and less than the first reference value when the interactive behavior information does not satisfy the preset condition; and sending, by the server, the target identity information and the value to the first terminal device via the first user account in response to the request.

7. An information updating and exchange system, comprising a terminal device, the terminal device comprising:

a memory for storing instructions; and at least one processor in communication with the memory, the processor, when executing the instructions, is configured to cause terminal device to:

access, from an application running on the terminal device, a remote information exchange platform via a first user account;

receive a first information posted from a second user account of the remote information exchange platform;

display the first information on a first user interface of the application on the terminal device;

receive, via the first user interface, a first user instruction associated with the first information for initiating a preset exchange event of resource transfer from the first user account to the second user account associated with the first information;

send, by the terminal device, the first instruction to a server for initiating the resource transfer;

receive, by the terminal device, a value associated with the resource transfer from the server, wherein the value is generated by the server according to an interactive behavior information between the first user account and the second user account, wherein the interactive behavior is detected by the server during a preset time period, and wherein the value is greater than or equal to a first reference value when the interactive behavior information satisfies a preset condition and is less than the first reference value when the interactive behavior information does not satisfy the preset condition;

generate, in response to the first user instruction, a second user interface for displaying an identity information of the first user account in an editable mode;

receive, via the second user interface, a second user instruction for using a target identity information to hide the identity information of the first user account temporarily during the preset exchange event of resource transfer;

detect whether the second user instruction carries the target identity information; and when it is determined that the second user instruction does not carry the target identity information:

send the second user instruction to a server;

receive the target identity information generated by the server in response to the second user instruction, wherein the server randomly extracts a first group from preset identity information groups and randomly extracts a piece of identity information comprising a celebrity's name from the first group as the target identity information; and display the target identity information in place of the identity information of the first user account displayed on the second user interface.

8. The information updating and exchange system according to claim 7, wherein at least one processor, when executing the instructions, is further configured to cause the terminal device to:

receive a third instruction on the second user interface for replacing the target identity information with the identity information of the first user account, after the identity information of the first user account displayed on the second user interface is replaced with the target identity information; and update the target identity information displayed on the second user interface to the identity information of the first user account.

9. The information updating and exchange system according to claim 8, wherein the at least one processor, when executing the instructions, is further configured to cause the terminal device to:

display, on the second user interface, a first prompt information for indicating that the identity information of the first user account is hidden from view for other user accounts of the remote information exchange platform when the identity information of the first user account displayed on the second user interface is replaced with the target identity information; and display, on the second user interface, second prompt information for indicating that the identity information of the first user account is in a viewable for other user accounts of the remote information exchange platform, when the target identity information is replaced with the identity information of the first user account.

10. The information updating and exchange system according to claim 7, wherein the at least one processor, after executing the instructions to cause the terminal device to detect whether the second user instruction carries the target identity information, is further configured to cause the terminal device to:

update the identity information of the first user account displayed on the second user interface to the target identity information carried in the second user instruction when it is detected that the second user instruction carries the target identity information.

11. The information updating and exchange system according to claim 7, wherein the at least one processor, when executing the instructions, is further configured to cause the terminal device to:

receive a comment message associated with the first information on the second user interface; and display the comment message and the target identity information to the second user account when the resource transfer from the first user account to the second user account is completed, wherein the identity information of the first user account is hidden from other user accounts of the information exchange platform.

12. The information updating and exchange system according to claim 7, wherein the remote information exchange platform comprises a multimedia instant messaging social media platform.

* * * * *